Feb. 27, 1945.  F. B. DOYLE ET AL  2,370,295
APPARATUS FOR DEHYDRATION
Filed July 17, 1943  2 Sheets-Sheet 1
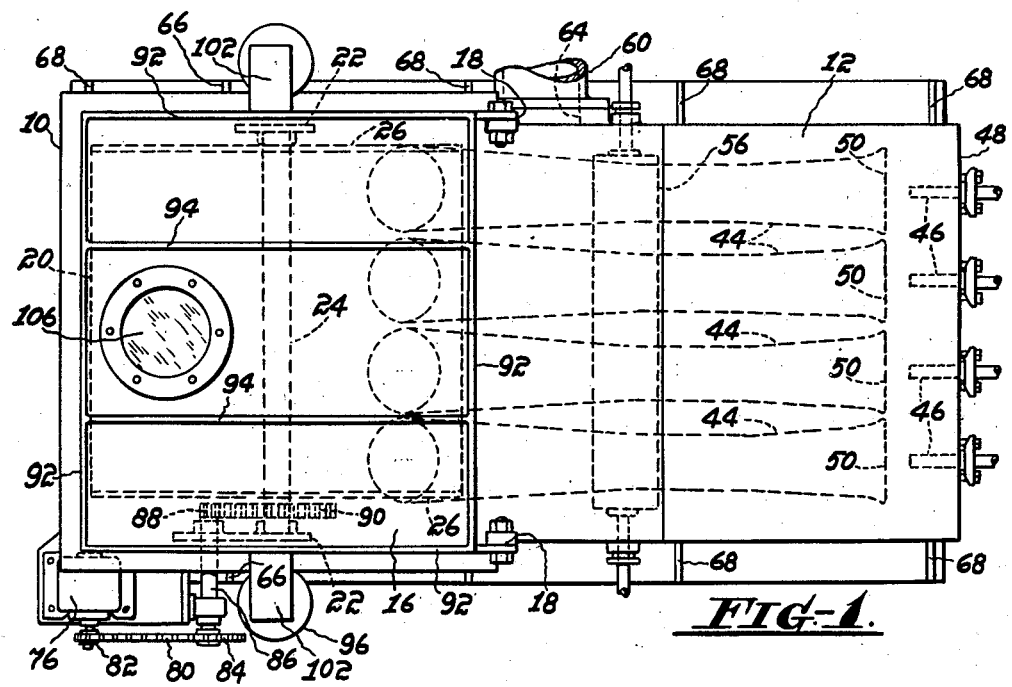
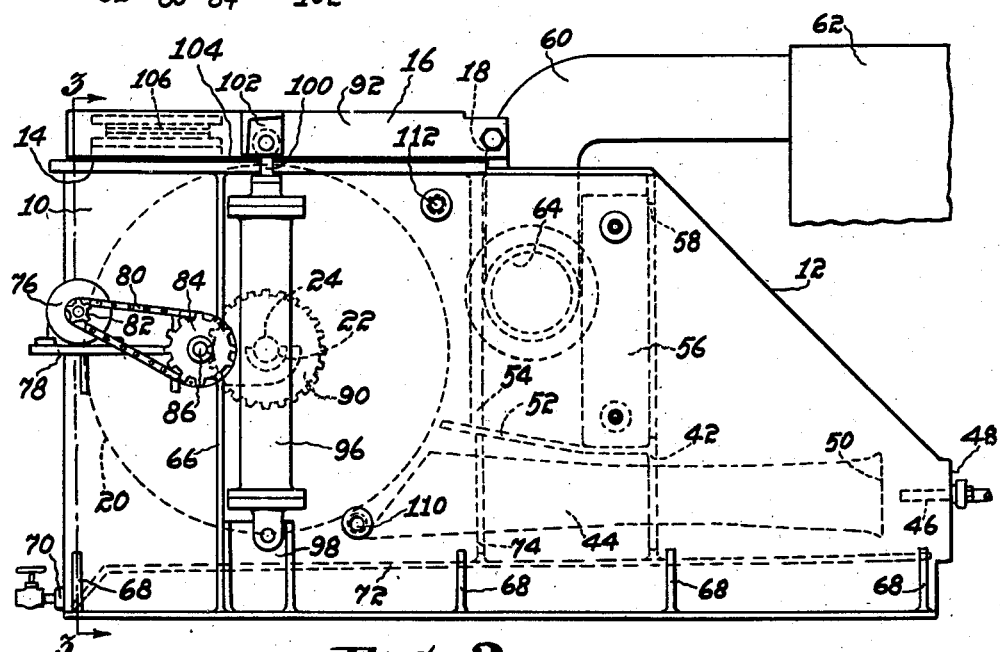
INVENTORS
FRANK B. DOYLE
EDWARD H. MARKLEY
AND JOHN F. PLUMMER JR.
BY
THEIR ATTORNEY.

Feb. 27, 1945.　　F. B. DOYLE ET AL　　2,370,295
APPARATUS FOR DEHYDRATION
Filed July 17, 1943　　2 Sheets-Sheet 2

INVENTORS
FRANK B. DOYLE
EDWARD H. MARKLEY
AND JOHN F. PLUMMER JR.
BY
THEIR ATTORNEY.

Patented Feb. 27, 1945

2,370,295

UNITED STATES PATENT OFFICE 2,370,295

APPARATUS FOR DEHYDRATION

Frank B. Doyle, Phillipsburg, N. J., Edward H. Markley, Easton, Pa., and John F. Plummer, Jr., Phillipsburg, N. J., assignors to Ingersoll-Rand Company, New York, N. Y., a corporation of New Jersey Application July 17, 1943, Serial No. 495,224

4 Claims. (Cl. 34—131)

This invention relates to dehydration of food substances and the like and, more particularly, to an apparatus for drying material such as vegetables and the like.

In methods heretofore used for drying vegetables, the product generally has been hard to reconstitute for the reason that the process as carried out makes the material shrink into a solid mass, as a rule. Another disadvantage of the drying methods of practice heretofore, is that a large portion of the vitamin content is lost, as well as the characteristic flavor of the material, its color, and palatability in general.

It is an object of this invention to produce dry vegetables in which substantially all of the vitamins are retained and in which the enzymes are inactivated, so that the food value of the product is preserved.

It is a further object to produce a product, which can be rapidly and thoroughly re-hydrated and in which after rehydration are restored the original flavor, color, appearance and palatability of the material.

It is a further object of the invention to provide apparatus in which this process may be conveniently and economically carried out.

Figure 3:
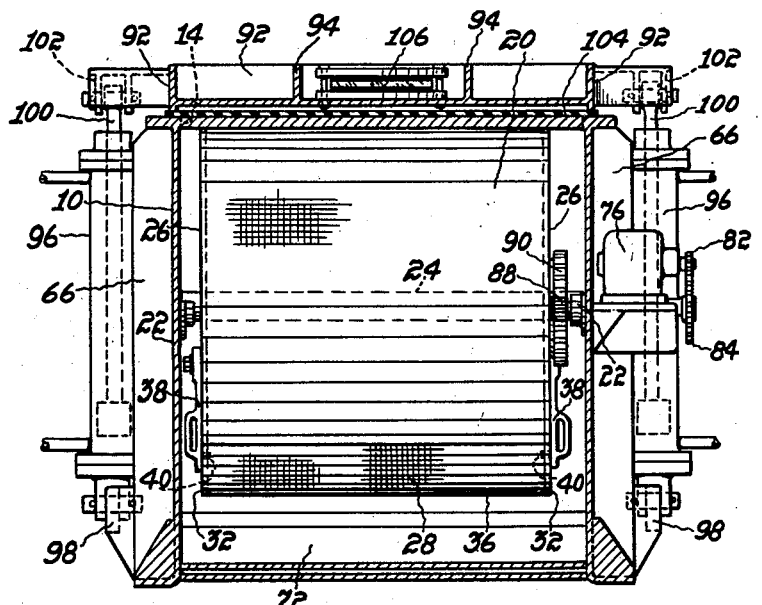
Figure 4:
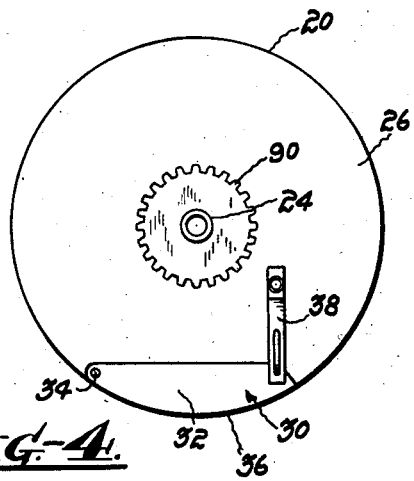

The drawings illustrate a preferred embodiment of the invention for carrying out the method and include Figure 1, which is a top plan view of the apparatus constructed in accordance with the practice of the invention, Figure 2, a side elevational view of the apparatus of Fig. 1, Figure 3, a cross-sectional view taken along the line 3—3 of Fig. 2 looking in the direction of the arrows, and Figure 4, an end view of the food containing drum.

The apparatus for carrying out the method will be described in detail first.

Referring to the drawings, the dehydrator is provided with a housing 10 in the form of a box of rectangular plan, having a rear sloping upper wall 12 and an opening as at 14, which is adapted to be closed by a cover or lid 16 hinged on the housing at suitable brackets 18. Within the housing 10 is provided a cylindrical drum 20 mounted for rotation in bearings 22, the drum being provided with a central axle 24 resting at its ends in the bearings 22. The drum is formed preferably of end plates 26, preferably circular, between which is mounted a peripheral wall of mesh material 28, which is adapted to support the vegetable matter or the like to be dried. Preferably, the mesh material is of woven wire of corrosion resistant material, such as stainless steel, Monel metal or the like, which can easily be cleaned and which will not chemically affect the food material. In this instance, access to the interior of the drum 20 is had by means of a door in the form of a hinged section of the periphery of the drum as shown at 30. In this instance, the door consists of two side plates 32 hinged on the plates 26 as at 34 and having meshed material at the outer periphery as at 36, which forms a continuation of the cylindrical form of the drum 20. The door 30 is adapted to be closed by two latches 38 provided with pins 40 adapted to fit into corresponding notches in the side plates 32.

Within the housing 10, supported by a vertically extending web 42, are arranged a plurality of diffusors 44 of steam jet booster pumps. Steam jets for these diffusors 44 are arranged at 46 and axially in line therewith. They are supported by the rear wall 48 of the housing 10 and extend therethrough for connection to a suitable source of high pressure steam (not shown).

The function of the steam jet booster pumps is to circulate steam within the housing 10 in a directed path including the drum 20. That is to say, the steam is adapted to be impelled at the drum through the diffusors 44 at high velocity, causing the steam, or a part of it, to be recirculated from the vicinity of the drum 20 back to the intakes 50 of the diffusors. To prevent short-circuiting of this path, a guide member 52 is provided, generally parallel to the forward ends of the diffusors 44 and held in place by brackets 54 and the web 42.

Means is provided for superheating steam so recirculated and to this end a superheating heat exchanger 56 of the surface type is provided between the drum 20 and the intake ends 50 of the diffusors 44. In this instance, the heat exchanger 56 is rectangular in form and is supported vertically at a rectangular aperture 58 in the web 42.

The housing 10 is adapted to be maintained for a considerable portion of the cycle in the drying process at a low absolute pressure. For this purpose a portion of the vapor generated is withdrawn through a suitable pipe 60 to a condenser 62 of any well known design equipped with the usual air and condensate removal apparatus (not shown). The pipe is connected to the housing 10 at an aperture 64 located in a side wall thereof and between the drum 20 and the superheater 56 so that when the flow of steam is produced by the booster pump, the vapor is removed before being superheated.

Inasmuch as the housing 10 is to be subjected to less than atmospheric pressures its walls are suitably ribbed as at 66 and the base is likewise provided with reinforcement ribs 68. At one phase of the cycle of operation moisture is likely to form, which is preferably collected at the bottom of the housing 10 and adapted to be withdrawn at a drain 70. In order to prevent the collecting water from being blown about, a sloping bottom 72 is provided for the housing 10 supported intermediate its ends by the web 42 and a vertical web 74.

During the drying process, the drum 20 is adapted to be rotated by means of an electric motor 76 suitably mounted on a bracket 78 on the outside of the housing 10. Rotation of the motor 76 is transmitted to the drum 20 by means of a chain 80 connecting a small sprocket 82 on the motor shaft to a larger sprocket 84 mounted on a transverse shaft 86 passing through the side wall of the housing 10 and having a pinion 88 on the inner side of the housing. The pinion 88 is arranged to be removably engaged with a larger gear 90 mounted on the shaft 24 and the drum 20 in such a way that as the drum 20 is lifted vertically from the bearings 22 gear 90 also disengages without interference.

The lid 14 is necessarily very heavy and is reinforced by a continuous external rib 92 and transverse strengthening ribs 94. As a convenient means for raising the lid 14, a pair of air cylinders 96 pivoted at one end to foot pieces 98 are provided with piston rods 100 pivotally attached at brackets 102 on the lid 14 and are adapted to raise the lid 14 to a vertical position to permit removal of the drum 20.

In its lowered position the lid 16 rests upon a gasket 104, which seals the opening 14. One is able to see into the interior of the housing 10 through a port provided with a glass window 106.

The apparatus above described is particularly adapted for treating vegetables. After the vegetables have been washed, peeled, sliced, etc. they are charged into the drum 20 by releasing the latches 38, opening the door 30, and dumping them into the interior. The door is then reclosed and latched. The drum is inserted through the opening 14 into the housing 10 with the ends of the axle 24 in place in the bearings 22. In this position the gear 90 engages the pinion 88. The lid 16 is then lowered by releasing air from the pneumatic cylinders 96 and some definite pressure is applied to the pistons to hold the lid 16 down on the gasket 104 thereby sealing the housing.

Blanching and some cooking of the raw product is then done by live steam admitted at the jets 46 to raise the temperature within the housing 10. In the case of potatoes, the temperature should preferably be raised to between 220° and 250° F. This temperature is held for a period of from three to ten minutes. During this time, substantially all of the air has been driven out of the chamber 10 and replaced by steam. The blanching period will vary with various products, some requiring more or less blanching time and temperature for thorough inactivation of the enzymes.

For some products the drum may be rotated by means of the electric motor 76, preferably slowly, to insure uniform blanching of the product in the drum. In other cases, the product is softened to such an extent by the heat that rotation of the drum is impractical at this step. During the blanching period, the material is thoroughly heated to a relatively high temperature, not only on its exterior but to the center of the pieces of vegetable. It is very important that this thorough heating should take place in order to make the succeeding steps of the process effective.

Immediately after blanching and without allowing the product to cool or come in contact with air, the chamber or housing 10 is quickly evacuated to an absolute pressure of approximately 1½" of mercury by suitable operation of the condenser 62 and its associated air removal apparatus. For some products the drum 20 is rotated during this initial evacuation, but in most cases it is not. In all cases, rotation is started as soon as the initial drying due to vacuum makes the product lose its fragility. Preferably, not more than one minute is allowed to elapse while the pressure is being reduced to 1½" of mercury, absolute pressure.

This quick evacuation causes a set of conditions wherein the water contained in the raw product at a temperature of approximately 200° F. has a vapor pressure of approximately 30" of mercury absolute, while the surrounding pressure in the chamber is 1½" of mercury absolute. This difference in pressure causes immediate violent flashing and removal of water and air from the product. If no more heat were added to the product, it would cool to approximately 92° F., which is the temperature corresponding to the saturated temperature of water vapor at 1½" of mercury absolute. In order to prevent the drop in temperature, heat is added concurrently with the evacuation of the chamber 10 for two reasons: 1. to keep the surfaces of the product pieces hot and thereby to minimize the adhesive properties of the superficial juices (sugars, starch, etc.); and 2. to eliminate any delay in the continuation of rapid drying. The extremely rapid flashing of water from the product, which is the first stage of the drying, arrests any collapsing or "mushing" of the product cells and thus creates a porous spongy product structure. Shrivelling is prevented by this rapid initial and continued drying. This is of great importance in the continuation of drying at a rapid rate, as will be explained hereinafter.

The addition of heat is accomplished, in this instance, by the superheater 56, which is arranged to maintain a relatively high temperature of the steam passing through it, preferably about 220–230° F. The circulation of steam or vapor is produced by the steam jet boosters which receive the superheated steam at the entrance 58 and by means of the steam jets 46 direct the superheated steam through the diffusors 44 and discharge it at an extremely high velocity against and through the mesh surface of the drum 20. The action of the steam from the jet booster pumps causes circulation in what may be called a steam circuit including the diffusors 44, the drum 20, and the superheater 56. The vacuum is produced by withdrawal of vapors and uncondensable gases through the pipe 60 to the condenser 62.

The superheated steam discharged from the diffusors 44 blasts through the drum 20 at an extremely high velocity of approximately 3000–4500 ft. or more per minute. It is adapted to tumble the product around in the drum with extreme violence thereby causing active contact of the steam with all surfaces of the product and thereby facilitating the process of quick drying. This high velocity impingement is of great importance to the success of the process. The closed drum 20, made principally of fairly fine mesh wire, permits the use of very high velocities, and the drum design and its position directly in the path of the steam from the diffusors 44, are important features.

Drying is continued in this manner and with the temperature of the steam maintained as high as possible without scorching the product, and with the maintenance of a high vacuum, until approximately 95% of the moisture in the product has been removed.

A convenience means of determining the dryness of the product is by measuring the temperature of the steam before it enters the drum and its temperature upon leaving the drum. In the early stages of the drying a relatively large amount of heat is absorbed in the product and used for vaporizing the water contained therein. Thus, there is a very considerable drop in steam temperature across the drum. As drying progresses, the temperature drop becomes less, theoretically zero when the material becomes "bone dry." Generally, however, a temperature drop of from 3° to 5° across the drum indicates that the product is substantially dry.

To observe the temperatures of the steam before entering the drum and after leaving it, suitable temperature indicating devices may be employed as at 110 and 112, the first being located close to the discharge of the diffusors 44 and the latter being located between the drum 20 and the superheater 56.

As has been described above, the product particles become porous at the initial stages of the evaporation due to the bursting effect of the violent evaporation in the cells. It is also essential that the evaporation be continued at a very rapid rate, failing which the particles will shrivel into a very hard mass. It is thought that shrivelling is due to slow evaporation, which permits the initially dry outer part of the particle to become wetted from the water contained at the center. Therefore, drying has to proceed at such a rate that in all cases the outer part of the particle is maintained dry, and the drying progresses inwardly to the center. To dry at such a rate requires that vapor flowing through the particles of products be at all times dry; that is, superheated, not only before contact with them but afterward as well. When the drying is completed in this manner, the particle stays porous and is easily and quickly re-hydrated. On the other hand, if the drying is not entirely completed as specified above, the entire mass becomes moist and subsequent drying shrivels it to a very undesirable product.

The superior characteristics of the product dehydrated by the above described processes are—

1. Excellent vitamin retention.
2. Inactivated enzymes.
3. Rapid and thorough re-hydration. And after re-hydration,
4. Excellent flavor, color, appearance and palatability.
5. Chewability.

While the invention is described as applied to fresh vegetables, it applies equally well to other food materials as fruits, meats, cereals, etc., and such applications are contemplated.

Thus, by the above construction and series of process steps are accomplished among others, the objects hereinbefore referred to.

We claim:

1. A dehydrator for vegetables and the like, comprising a housing, a drum mounted for rotation in said housing and adapted to receive the material to be dried, a steam jet circulator pump having an exhaust diffusor pointed directly at the lower part of the drum, a partition to define a return passage for the steam from the drum to the pump inlet, and a steam offtake in said passage.

2. A dehydrator for vegetables and the like, comprising a housing, a drum mounted for rotation in said housing and adapted to receive the material to be dried, a steam jet circulator pump having an exhaust diffusor pointed directly at the lower part of the drum, a partition to define a return passage for the steam from the drum to the pump inlet, a steam offtake in said passage, and a superheater in said return passage between the offtake and the pump inlet.

3. A dehydrator for vegetables and the like, comprising a housing, a drum mounted for rotation in said housing, and adapted to receive the material to be dried, a steam jet circulator having an exhaust diffusor pointed directly at the lower part of the drum, a partition to define a return passage for the steam from the drum to the pump inlet, a steam offtake in said passage, and a door for the housing adjacent the drum to permit removal of the drum from the housing.

4. A dehydrator for vegetables and the like, comprising a housing, a drum mounted for rotation in said housing and adapted to receive the material to be dried, a steam jet circulator pump having an exhaust diffusor pointed directly at the lower part of the drum, a partition to define a return passage for the steam from the drum to the pump inlet, a steam offtake in said passage, a superheater in said return passage between the offtake and the pump inlet, and a door for the housing adjacent the drum to permit removal and insertion of the drum with respect to the housing.

FRANK B. DOYLE.
EDWARD H. MARKLEY.
JOHN F. PLUMMER, Jr.